(12) United States Patent
Nakatsuka et al.

(10) Patent No.: US 8,526,339 B2
(45) Date of Patent: Sep. 3, 2013

(54) ECHO CANCELLATION CIRCUIT

(75) Inventors: Shinji Nakatsuka, Kanagawa-ken (JP); Kazuhiro Oda, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 172 days.

(21) Appl. No.: 13/044,346

(22) Filed: Mar. 9, 2011

(65) Prior Publication Data

US 2011/0222446 A1 Sep. 15, 2011

(30) Foreign Application Priority Data

Mar. 15, 2010 (JP) .................................. 2010-057922
Mar. 15, 2010 (JP) .................................. 2010-057923

(51) Int. Cl.
  *H04B 3/20* (2006.01)
(52) U.S. Cl.
  USPC ....... 370/286; 370/289; 379/406.01; 455/570
(58) Field of Classification Search
  USPC ................. 379/406, 339; 381/94.1; 370/286, 370/289, 287, 291, 329, 290; 375/240.2, 375/330, 232; 455/41.1
  See application file for complete search history.

(56) References Cited

U.S. PATENT DOCUMENTS

2005/0232362 A1* 10/2005 Lee ........................... 375/240.23
2006/0133303 A1* 6/2006 Shida ............................ 370/286

FOREIGN PATENT DOCUMENTS

| JP | 62-065526 | 3/1987 |
| JP | 62-147820 | 7/1987 |
| JP | 62-271528 | 11/1987 |
| JP | 02-075229 | 3/1990 |
| JP | 03-106193 | 5/1991 |
| JP | 03-187530 | 8/1991 |
| JP | 05-150795 | 8/1993 |
| JP | 08-213940 | 8/1996 |

OTHER PUBLICATIONS

Office Action for Japanese Patent Application No. 2010-057922, mailed Jul. 17, 2012, 4 pgs. (with English translation).
Office Action for Japanese Patent Application No. 2010-057923, mailed Jul. 17, 2012, 4 pgs. (with English translation).
Office Action for Chinese Patent Application No. 201110061670.0, dated Mar. 25, 2013, 15 pgs., State Intellectual Property Office of the People's Republic of China (with English translation).

* cited by examiner

*Primary Examiner* — Andrew Lai
*Assistant Examiner* — Jamaal Henson
(74) *Attorney, Agent, or Firm* — Sprinkle IP Law Group (57) ABSTRACT

An echo cancellation circuit in a full duplex two-way communication system comprising: an input/output terminal; a subtractor having a positive and a negative input terminals, in which a first transmission signal is inputted to the negative input terminal as a pseudo echo signal, the first transmission signal is inputted through an output buffer to the positive input terminal as an echo signal, the pseudo echo signal inputted to the negative input terminal is subtracted from the echo signal inputted to the positive input terminal; and a result of the subtraction is outputted; and an echo cancellation error reducing unit having a D/A converter at an input side or an output side of the subtractor.

8 Claims, 6 Drawing Sheets

| DATA1 | DATA0 | TERNARY VALUE OUTPUT |
|---|---|---|
| H | H | H |
| H | L | NA |
| L | H | O |
| L | L | L |

ECHO CANCELLATION CIRCUIT

CROSS-REFERENCE TO RELATED APPLICATIONS

This application claims the benefit of Japanese Application No. 2010-57922 filed in Japan on Mar. 15, 2010 and Japanese Application No. 2010-57923 filed in Japan on Mar. 15, 2010, the contents of which are incorporated herein by this reference.

FIELD

Embodiments described herein relates generally to an echo cancellation circuit.

BACKGROUND

In the case where echo cancellation is solely implemented by an analog system, a difference between the amplitudes of two this-end signal paths is caused due to the influence of the load of e.g., a signal cable, and the difference appears as an echo cancellation error. The echo cancellation error may cause an amplitude error and/or deterioration of jitter. It has been desired to suppress such an echo cancellation error with a simple configuration.

DETAILED DESCRIPTION

One embodiment discloses an echo cancellation circuit in a full duplex two-way communication system in which a first communication device and a second communication device make two-way communication with each other through a same signal cable, the echo cancellation circuit comprising: an input/output terminal for transmitting a first transmission signal from the first communication device to the second communication device or receiving a second transmission signal transmitted from the second communication device; a subtractor having a positive input terminal and a negative input terminal, in which the first transmission signal is inputted to the negative input terminal as a pseudo echo signal, the first transmission signal is inputted through an output buffer to the positive input terminal as an echo signal, the pseudo echo signal inputted to the negative input terminal is subtracted from the echo signal inputted to the positive input terminal; and a result of the subtraction is outputted; and an echo cancellation error reducing unit having an A/D converter and a D/A converter at an input side or an output side of the subtractor.

Hereinafter, the embodiments of the present invention are described with reference to the drawings. In the description, common portions are labeled with common reference symbols throughout the drawings.

<Full Duplex Two-Way Communication System>

Before the embodiments according to the present invention are described in FIGS. 1 to 12, a full duplex two-way communication system on which an echo cancellation circuit is mounted is briefly described with reference to FIGS. 13 and 14.

Figure 13:
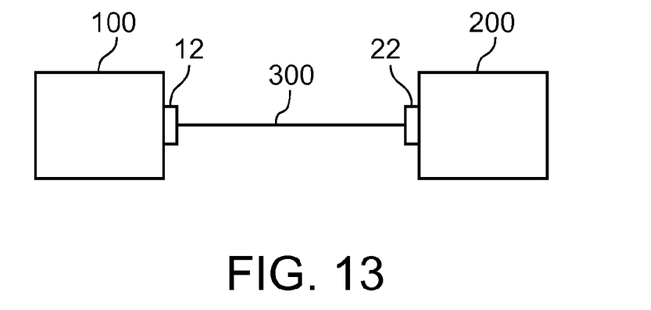
FIG. 13 is a diagram showing a full duplex two-way communication system

The full duplex two-way communication system shown in FIG. 13 are configured to be capable of making two-way communication with each other simultaneously via one signal cable 300 connected to each of the two-way communication input/output terminals 12, 22 between the two two-way communication devices 100 and 200.

Within the two two-way communication devices 100, 200, respective echo cancellation circuits connected to the respective two-way communication input/output terminals 12, 22 are provided. For example, as shown in FIG. 14, the inside the two-way communication device 100 is provided with an echo cancellation circuit 10 connected to the two-way communication input/output terminal 12, and this-end transmission signal generated inside this-end communication device 100 is outputted from the two-way communication input/output terminal 12 through an output buffer 11 to the signal cable 300 which is externally connected. Solid line arrows a1, a2, b in FIG. 14 show three signal paths for this-end transmission signal generated by this-end communication device 100, and dotted line arrow c shows the path for the signal received through the signal cable 300 from the other-end communication device 200.

This-end transmission signal is supplied to +input terminal and −input terminal of a subtractor 13 via two this-end signal paths a1 and a2, respectively. Of these signals, this-end transmission signal through the output buffer 11 is outputted to the other-end communication device from the two-way communication input/output terminal 12 through a signal path b, while being supplied to the +input terminal of the subtractor 13 through the signal path a2.

Figure 14:
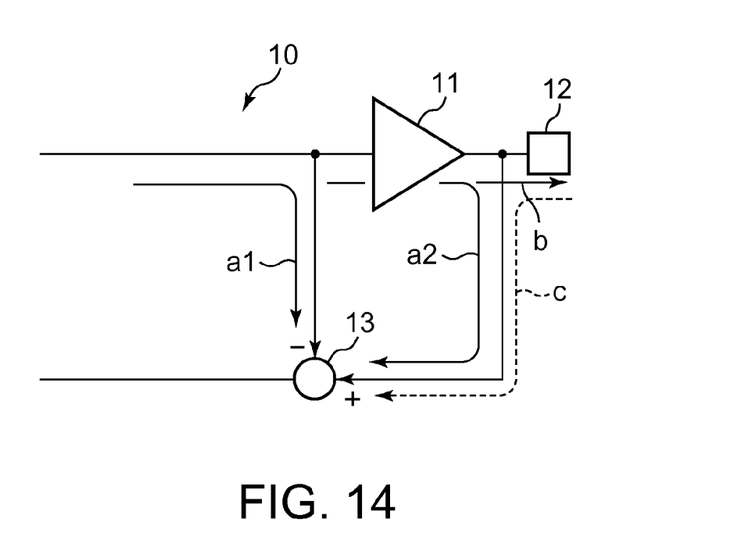
FIG. 14 is a circuit diagram showing a conventional echo cancellation circuit.

In the case where echo cancellation is all achieved by an analog system, as shown in FIG. 14, the signal path a2 is connected to the load of the signal cable 300 or output terminal 12 which is connected to the two-way communication input, thus a difference in amplitude between two this-end signal paths a1, a2 is caused, and the difference is outputted from the subtractor 13 as an echo cancellation error. The echo cancellation error may cause an amplitude error and/or deterioration of jitter to the signal received from the other-end communication device.

<<First Embodiment>>

Figure 1:
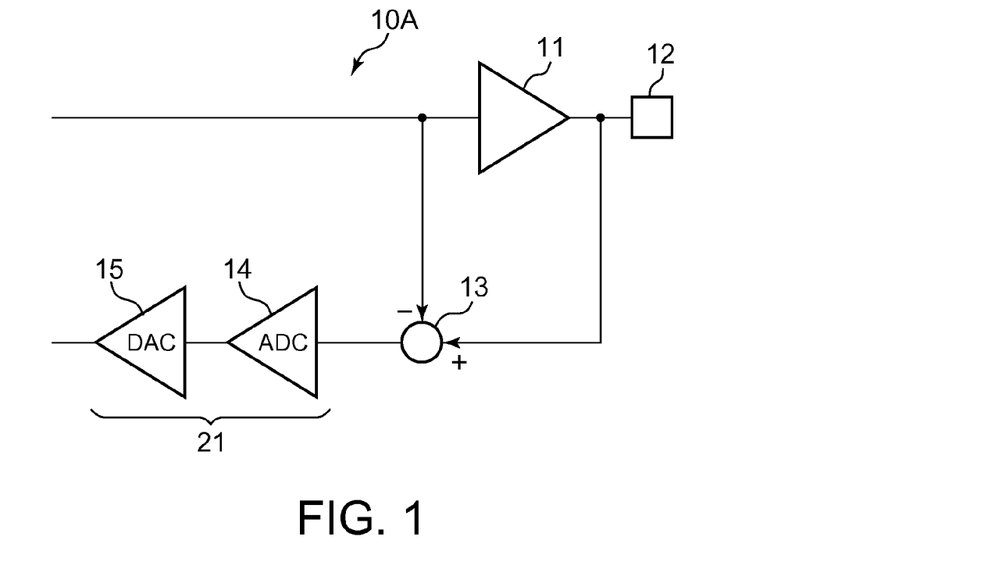
FIG. 1 is a block diagram showing an echo cancellation circuit according to a first embodiment of the present invention.

FIG. 1 is a block diagram showing an echo cancellation circuit 10A according to the first embodiment of the present invention.

The echo cancellation circuit 10A of the first embodiment is used for a full duplex two-way communication system in which a this-end communication device and the other-end communication device make two-way communication with each other through the same signal cable. The echo cancellation circuit 10A includes an output buffer 11, a two-way communication input/output terminal 12, a subtractor 13, and an echo cancellation error reducing unit 21.

The two-way communication input/output terminal 12 is an input/output terminal for transmitting a this-end transmission signal (hereinafter, referred to as a this-end transmission signal) from the this-end communication device to the other-end communication device or for receiving an other-end-side transmission signal (hereinafter, referred to as an other-end transmission signal) from the other-end communication device.

The subtractor 13 has a positive input terminal and a negative input terminal; this-end transmission signal is inputted to the negative input terminal as a pseudo echo signal; this-end transmission signal is inputted to the two-way communication input/output terminal 12 through the output buffer 11, while being inputted to the positive input terminal; the pseudo echo signal inputted to the negative input terminal is subtracted from the echo signal inputted to the positive input terminal; and the subtraction result is outputted to this-end communication device as an echo cancellation output.

The echo cancellation error reducing unit 21 has a function of reducing the echo cancellation error output (hereinafter simply referred to as an echo cancellation output) generated as the subtraction result from the subtractor 13 by using a combinational circuit of an A/D converter and a D/A converter at the output side of the subtractor 13.

Specifically, the echo cancellation error reducing unit 21 is disposed on the path along which the echo cancellation output from the subtractor 13 is outputted to this side communication device on the output side of the subtractor 13. The echo cancellation error reducing unit 21 is a circuit which combines an A/D converter 14 for inputting the echo cancellation output from the subtractor 13 and removing its amplitude errors, and a D/A converter 15 for converting the digital output from the A/D converter 14 back to an analog signal.

In such a configuration, it is possible to remove the echo cancellation errors of the A/D converter 14 which equal or fall below a threshold value by receiving the echo cancellation output outputted from the subtractor 13 with the A/D converter 14. The threshold value of the A/D converter 14 herein means the threshold value that defines a acceptable range in which when '0' is detected from the analog signals inputted to the A/D converter 14, the echo cancellation output (cancellation error) can be accepted as '0' (that is to say, can be assumed to be '0').

By outputting the signal via D/A converter 15 after removing the amplitude errors equaling or falling below the threshold value with the A/D converter 14, amplitude-fluctuating signal around '0' with its noise removed is outputted as a digital signal of exact '0', then is further outputted as the analog output of '0' from the D/A converter 15. Thereby, in the echo cancellation circuit in the full duplex two-way communication apparatus, errors remaining after echo-cancellation can be eliminated and removed. Furthermore, this can be achieved with a simple configuration.

Figure 2:
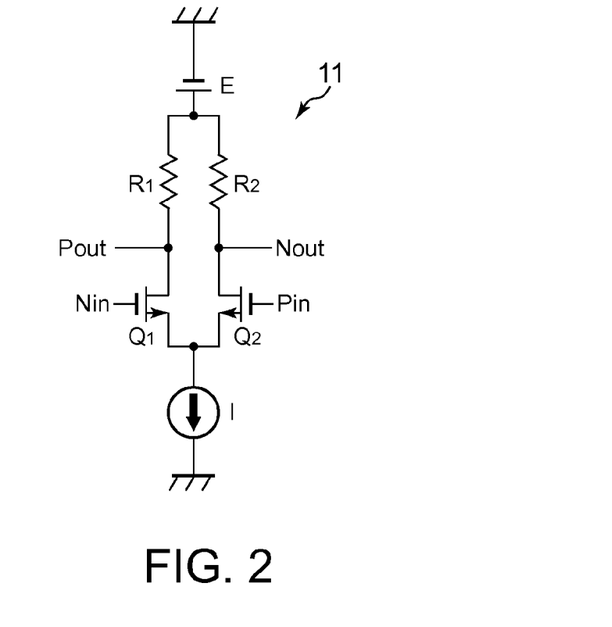
FIG. 2 is a circuit diagram showing an exemplary configuration of the output buffer in FIG. 1.

FIG. 2 shows an exemplary configuration of the output buffer in FIG. 1. The output buffer 11 inputs a ternary signal, and outputs a ternary signal.

The output buffer 11 shown in FIG. 2 includes an NMOS transistor Q1 to which ternary input voltage Nin is inputted at the gate thereof; an NMOS transistor Q2 to which ternary input voltage Pin is inputted at the gate thereof; resistances R1, R2 connected to the NMOS transistors Q1, Q2, respectively; a direct current power supply E; and a constant current source I.

Respective sources of the NMOS transistors Q1, Q2 are connected to a point in common, and the common connection point is connected to the constant current source I, and respective drains of the NMOS transistors Q1, Q2 are connected to the direct current power supply E via the resistances R1, R2, respectively. The characteristics of the NMOS transistors Q1, Q2 are the same, and the values of the resistances R1, R2 are also the same. Then differential signals Nin, Pin are inputted as ternary signal (for example, ether signal) to the respective gates of the NMOS transistors Q1, Q2 so that ternary outputs Pout, Nout are obtained from respective drains of the NMOS transistors Q1, Q2.

Although the ternary value indicates +1, 0, −1, ether signal is represented by two lines, and P signal is inputted to one line, and N signal is inputted to the other line so that the ternary value can be represented as a pair of P and N signals based on High-Low relationship between P and N signals. The ternary representation is expressed based on binary relationship of High level (H) and Low level (L) of P, N signals.

That is to say, when P signal is greater than N signal, the signal in a ternary representation indicates +1; when P and N signals are the same, the signal in a ternary representation indicates 0; when P signal is smaller than N signal, the signal in a ternary representation indicates +1. Consequently, +1 in ternary occurs when P signal is H level and N signal is L level, and −1 in ternary occurs when P signal is L level and N signal is H level. Also, '0' in ternary occurs when both P and N signal have the same degree, for example, H/2 level.

When input signal Pin is H level, and Nin signal is L level, transistor Q2 is turned on, and transistor Q1 is turned off, so the output signal Pout is H level, and the output signal Nout is L level, i.e., P>L, thus a pair of P, N signals with H, L levels indicating +1 in ternary is outputted to the two-line communication cable from the two-way communication input output terminal 12 to the other-end communication device.

Also when input signal Pin is L level, and Nin signal is H level, transistor Q2 is turned off, and transistor Q1 is turned on, so the output signal Pout is L level, and the output signal Nout is H level, i.e., P<L, thus a pair of P, N signals with L, H levels indicating −1 in ternary is outputted to the two-line communication cable from the two-way communication input output terminal 12 to the other-end communication device.

To the circuit of FIG. 2, differential binary (+1, −1) system may be applied instead of differential ternary (+1, 0, −1) system. In the case of differential binary system, there is no relationship of P=N for P, N signals, which corresponds to the case where only the signal level relationship with one signal being H level, the other signal being L level exists.

Figure 3:
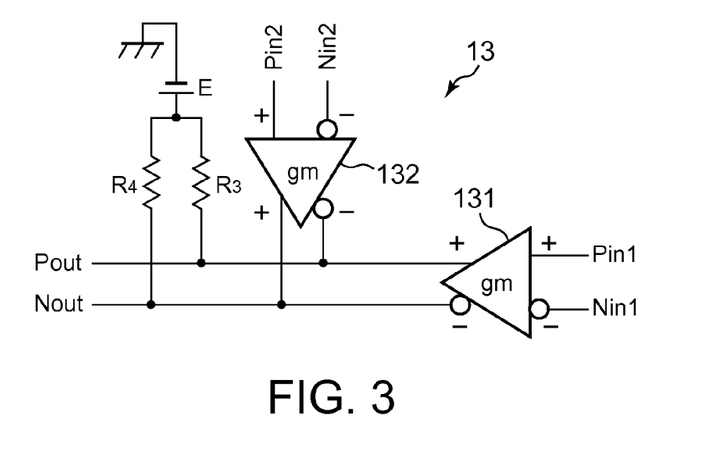
FIG. 3 is a circuit diagram showing an exemplary configuration of the subtractor in FIG. 1.

FIG. 3 shows an exemplary configuration of the subtractor 13 in FIG. 1.

The subtractor 13 shown in FIG. 1 includes the first amplifier 131 on the echo signal side with the transconductance of gm, the second amplifier 132 on the pseudo echo signal side with the transconductance of gm, resistances R3, R4 for obtaining respective output voltages of P, N signals, and the direct current power supply E. The transconductance gm is defined as the value obtained by differentiating the output current with respect to the input voltage.

Differential input voltages Pin1, Nin1 of the echo signal are supplied to the first amplifier 131 as an input, and differential input voltages Pin2, Nin2 of the pseudo echo signal are supplied to the first amplifier 131 as an input. The input voltage Pin1 labeled with + is directly connected to the output voltage Pout line labeled with +; the input voltage Nin1 labeled with − is directly connected to the output voltage Nout line labeled with −; the input voltage Nin2 labeled with − is directly connected to the output voltage Pout line labeled with +; and the input voltage Pin2 labeled with + is directly connected to the output voltage Pout line labeled with −.

In this configuration, for the first amplifier 131 having a transconductance gm, the input voltages Pin1, Nin1 are converted to currents, and for the second amplifier 132 having a transconductance gm, the input voltages Pin2, Nin2 are converted to currents. That is to say, when there is a voltage difference of 1V between the input voltages Pin1, Nin1 and the input voltages Pin2, Nin2, the operation of the subtractor 13 may be described in terms of the output of the current difference in ampere. In this manner, the current corresponding to the difference between the output current of the first amplifier 131, and the output current of the second amplifier 132 flows from the power supply E to the resistances R3, R4, and the voltages corresponding to the products between the current value and the resistances R3, R4 are outputted as output voltages Pout, Nout.

Figure 4:
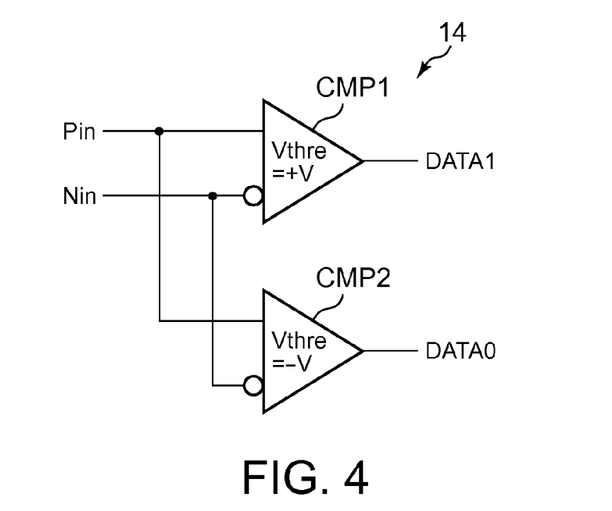
FIG. 4 is a circuit diagram showing an exemplary configuration of the A/D converter in FIG. 1.

FIG. 4 shows an exemplary configuration of the A/D converter 14 in FIG. 1. In FIG. 4, an example of differential ternary described above is shown.

In the case of differential ternary, two differential comparators CMP1, CMP2 are used, but in the case of differential binary, only one differential comparator may be used. The differential signal Pin is inputted to the non-inverted input terminal of the differential comparator CMP1, and the differential signal Nin is inputted to the inverted input terminal of the differential comparator CMP1. At the same time, the differential signal Pin is inputted to the non-inverted input terminal of the differential comparator CMP2, and the differential signal Nin is inputted to the inverted input terminal of the differential comparator CMP2.

Two differential comparators CMP1, CMP2 have threshold values +V, −V, respectively.

In the differential comparator CMP1, when the difference Pin-Nin between input Pin and input Nin exceeds the threshold value +V, the output DATA1 is set to H level, and when the difference Pin-Nin between input Pin and input Nin falls below the threshold value +V, the output DATA1 is set to L level.

Also, in the differential comparator CMP2, when the difference Pin-Nin between input Pin and input Nin exceeds the threshold value −V, the output DATA0 is set to H level, and when the difference Pin-Nin between input Pin and input Nin falls below the threshold value −V, the output DATA0 is set to L level. Because the two differential comparators CMP1, CMP2 have such threshold values, the value of the difference Pin-Nin can be classified as one of three cases: the value is less than the threshold value −V; the value is between −V and +V; and the value is greater than +V.

Figure 5:
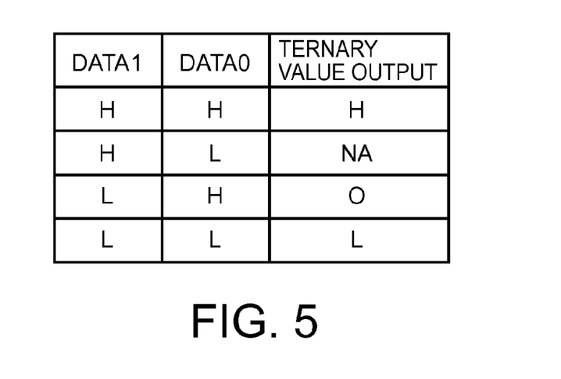
FIG. 5 is a truth table showing the relationship between outputs DATA1, DATA0 in FIG. 4 and a ternary output.

FIG. 5 shows the relationship between outputs DATA1, DATA0 in FIG. 4 and a ternary output.

As shown in FIG. 5, when the output DATA1, DATA0 are H, H levels, respectively, the ternary output is determined to be H level; when the output DATA1, DATA0 are L, H levels, respectively, the ternary output is determined to be 0; and when the output DATA1, DATA0 are L, L levels, respectively, the ternary output is determined to be L level.

According to the first embodiment, by receiving the echo cancellation output outputted as a cancellation error from the subtractor with the A/D converter, the cancellation errors of the A/D converter, which equal or fall below the threshold value are eliminated. Thus the echo cancellation error at this-end communication device in the two-way communication system can be reduced, and the transmission signal from the other-end communication device can be securely received with a simple configuration. Thereby, when two-way communication is made with each other through the same signal cable between two-way communication devices, echo cancellation errors can be effectively reduced.

<Second Embodiment>

Figure 6:
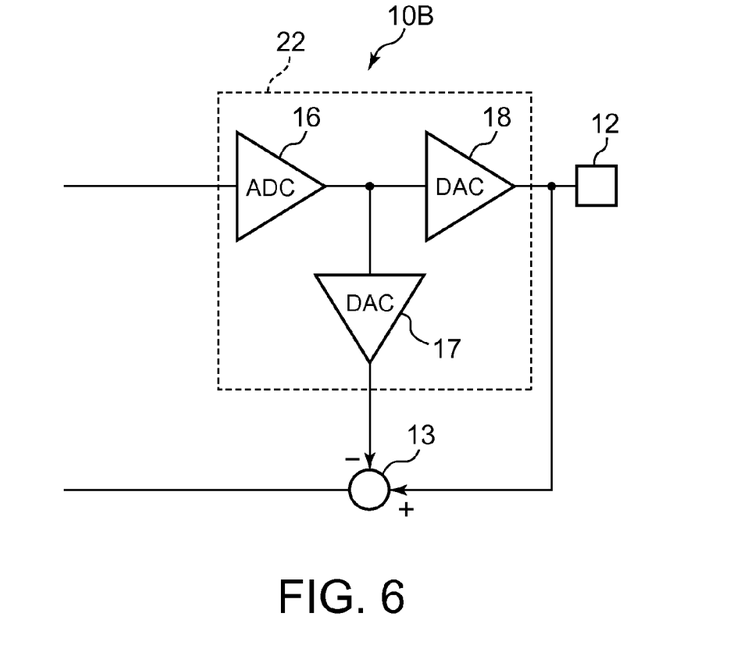
FIG. 6 is a block diagram showing an echo cancellation circuit according to a second embodiment of the present invention.

FIG. 6 shows an echo cancellation circuit 10B according to the second embodiment of the present invention.

The echo cancellation circuit JOB of the second embodiment shown in FIG. 6 is the echo cancellation circuit in a full duplex two-way communication system in which a this-end communication device and an other-end communication device make two-way communication with each other through the same signal cable. The echo cancellation circuit 10B includes an echo cancellation error reducing unit 22, the two-way communication input/output terminal 12, and the subtractor 13.

The echo cancellation error reducing unit 22 is provided on the input side of the subtractor 13, and is configured with a combinational circuit of an A/D converter and a D/A converter, the combinational circuit including an A/D converter 16 which performs A/D conversion of this-end transmission signal; and two D/A converters 17, 18 which divide the digital output from the A/D converter 16 into two this-end transmission signal paths, and perform D/A conversion so that the converted signal is outputted with the same analog signal amplitude maintained. The D/A converter 18 also have a function as an output buffer as shown in FIG. 1.

The two-way communication input/output terminal 12 is an input/output terminal for transmitting this-end transmission signal from this-end communication device to the other-end communication device or for receiving the other-end transmission signal from the other-end communication device.

The subtractor 13 has a positive input terminal and a negative input terminal; pseudo echo signal generated by sending this-end transmission signal through the A/D converter 16 and the D/A converter 17 is inputted to negative input terminal; the signal generated by sending this-end transmission signal through the A/D converter 16 and the D/A converter 18 is inputted to the two-way communication input/output terminal 12, while being inputted to the positive input terminal as an echo signal; pseudo echo signal inputted to the negative input terminal is subtracted from the echo signal inputted to the positive input terminal; and the subtraction result is transmitted to this-end communication device as an echo cancellation output. The configuration of the subtractor 13 is similar to that shown in FIG. 3.

In such a configuration, the echo cancellation error reducing unit 22 receives a this-end transmission signal by the A/D converter 16, and makes the signal pass therethrough, then divides the signal into two first and second this-end transmission signal paths for transmission; an amplitude difference in two input signals used for the echo cancellation of the above-described subtractor 13 is reduced by passing this-end transmission signal through the D/A converters 17, 18 along the respective first and second this-end transmission signal paths;

this-end transmission signal sent to the first this-end transmission signal path is inputted to the negative input terminal of the subtractor 13 as a pseudo echo signal via the first D/A converters 17; and this-end transmission signal sent to the second this-end transmission signal path is inputted to the positive input terminal of the subtractor 13 as an echo signal via the second D/A converters 18. In the case where the D/A converters 17, 18 have equivalent characteristics, two input signals are inputted to two input terminals of the subtractor 13 without an error, thus the echo cancellation error outputted from the subtractor 13 is extremely low value, and almost '0' is outputted.

According to the second embodiment, after this-end transmission signal is once received by the A/D converter at the input side of the subtractor, two inputs to the subtractor are made through two input paths (two D/A converters) in almost the same conditions so that an output with the echo cancellation error removed is obtained from the subtractor. Thus the echo cancellation error at this-end communication device in the two-way communication system can be significantly reduced, and the transmission signal from the other-end communication device can be securely received with a simple configuration. Thereby, when two-way communication is made with each other through the same signal cable between two-way communication devices, echo cancellation errors can be effectively reduced.

<Third Embodiment>

Figure 7:
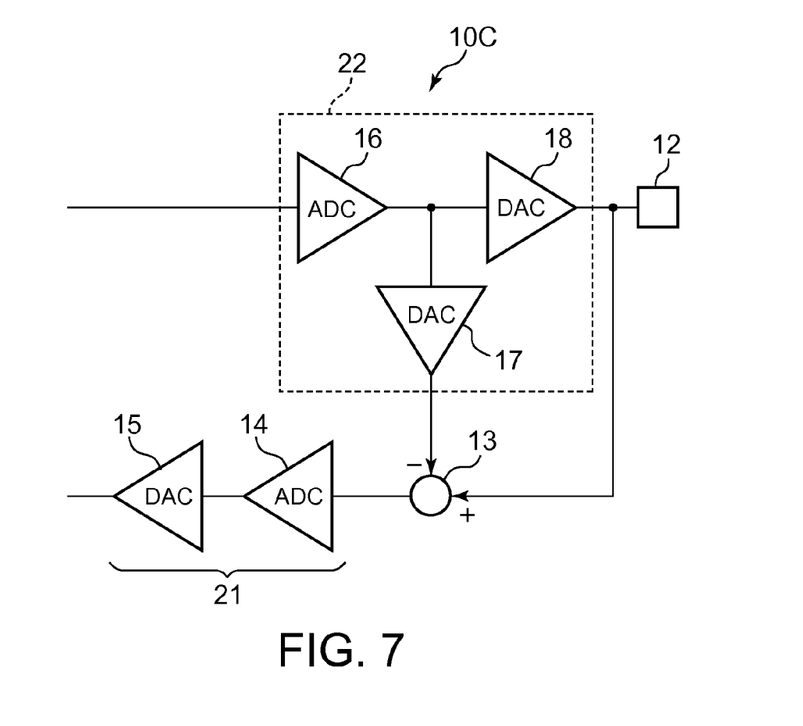
FIG. 7 is a block diagram showing an echo cancellation circuit according to a third embodiment of the present invention.

FIG. 7 is a block diagram showing an echo cancellation circuit according to the third embodiment of the present invention.

An echo cancellation circuit 100 of the third embodiment shown in FIG. 7 is the echo cancellation circuit in full duplex two-way communication system in which a this-end communication device and an other-end communication device make two-way communication with each other through the same signal cable. The echo cancellation circuit 100 includes the two-way communication input/output terminal 12, the subtractor 13, the echo cancellation error reducing unit 22 shown in the second embodiment of FIG. 6, and the echo cancellation error reducing unit 21 shown in the first embodiment of FIG. 1.

A first echo cancellation error reducing unit 21 is provided on the output side of the subtractor 13, and includes a combinational circuit of the first A/D converter and D/A converter, which has an A/D converter 14 for inputting the echo cancellation output from the subtractor 13 and removing its amplitude errors; and the D/A converter 17 for converting the digital output from the A/D converter 14 back to an analog signal.

A second echo cancellation error reducing unit 22 is provided on the input side of the subtractor 13, and includes a combinational circuit of an A/D converter and a D/A converter, the combinational circuit having an A/D converter 16 which performs A/D conversion of this-end transmission signal; and two D/A converters 17, 18 which divide the digital output from the A/D converter 16 into two this-end transmission signal paths, and perform D/A conversion so that the converted signal is outputted with the same analog signal amplitude maintained.

The two-way communication input/output terminal 12 transmits this-end transmission signal from this-end communication device to the other-end communication device or receives the other-end transmission signal from the other-end communication device to this-end communication device.

The subtractor 13 a positive input terminal and a negative input terminal; pseudo echo signal generated by sending this-end transmission signal through the A/D converter 16 and the D/A converter 17 is inputted to negative input terminal; the signal generated by sending this-end transmission signal through the A/D converter 16 and the D/A converter 18 is inputted to the two-way communication input/output terminal 12, while being inputted to the positive input terminal as an echo signal; pseudo echo signal inputted to the negative input terminal is subtracted from the echo signal inputted to the positive input terminal; and the subtraction result is transmitted to this-end communication device, as an echo cancellation output.

In such a configuration, the second echo cancellation error reducing unit 22 makes this-end transmission signal pass through the A/D converter 16, and passes the signal therethrough, then transmits the signal to two first and second this-end transmission signal paths; an amplitude difference in two input signals used for the echo cancellation of the above-described subtractor 13 is reduced by passing this-end transmission signal through the D/A converters 17, 18 along the respective first and second this-end transmission signal paths; this-end transmission signal sent to the first this-end transmission signal path is inputted to the negative input terminal of the subtractor 13 as a pseudo echo signal via the first D/A converters 17; and this-end transmission signal sent to the second this-end transmission signal path is inputted to the positive input terminal of the subtractor 13 as an echo signal via the second D/A converters 18.

The first echo cancellation error reducing unit 21 is a circuit in combination with the A/D converter 14 for removing amplitude errors, which is disposed on the path along which the echo cancellation output from the subtractor 13 is transmitted into this-end communication device, and the D/A converter 15 for analog conversion, which is disposed in a subsequent stage. The echo cancellation output from the subtractor 13 is inputted to the A/D converter 14 so that the amplitude errors which equal or fall below the threshold value set in the A/D converter 14 are removed, then later the echo cancellation output is outputted through the D/A converter 15.

According to the third embodiment, an echo cancellation circuit with extremely few echo cancellation errors, that has the advantages of the first embodiment in addition to the advantages of the second embodiment can be achieved.

According to the first, second, third embodiments, an echo cancellation circuit can be achieved so that when two-way communication devices make two-way communication with each other through the same signal cable, echo cancellation errors can be effectively reduced to be almost zero.

<Fourth Embodiment>

Figure 8:
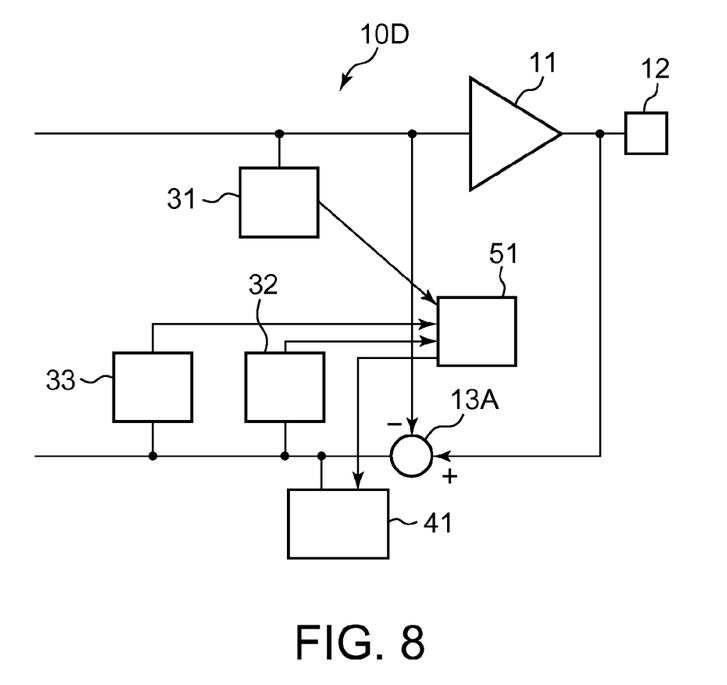
FIG. 8 is a block diagram showing an echo cancellation circuit according to a fourth embodiment of the present invention.

FIG. 8 is a block diagram showing an echo cancellation circuit according to the fourth embodiment of the present invention.

An echo cancellation circuit 10D in FIG. 8 is the echo cancellation circuit in full duplex two-way communication system in which a this-end communication device and the other-end communication device make two-way communication with each other through the same signal cable. The echo cancellation circuit 10D includes the output buffer 11, the two-way communication input/output terminal 12, the subtractor 13, detection circuit units 31 to 33 including '0' detection (hereinafter, simply referred to as a 0 detection) circuit 31, 0 detection circuit 32, an amplitude detection circuit 33, DC offset addition/subtraction circuit 41, and a control circuit 51.

The two-way communication input/output terminal 12 is an input/output terminal for transmitting this-end transmission signal from this-end communication device to the other-end communication device or for receiving the other-end transmission signal from the other-end communication device.

The subtractor 13A has a positive input terminal and a negative input terminal; this-end transmission signal is inputted to the negative input terminal (−) as a pseudo echo signal; this-end transmission signal is inputted to the two-way communication input/output terminal 12 through the output buffer 11, while being inputted to the positive input terminal (+); the pseudo echo signal inputted to the negative input terminal is subtracted from the echo signal inputted to the positive input terminal; and the subtraction result is outputted to this-end communication device as an echo cancellation output.

The detection circuit units 31 to 33 include the 0 detection circuit 31 for detecting 0 value in this-end transmission signal; the 0 detection circuit 32 for detecting 0 value in the echo cancellation output from the subtractor 13A; and the amplitude detection circuit 33 for detecting an amplitude in the echo cancellation output from the subtractor 13A. The detection circuit units 31 to 33 detect 0 value in this-end transmission signal, and detects 0 value and an amplitude in the echo cancellation output.

The 0 detection circuit 31 and 0 detection circuit 32 are implemented with the A/D converter as shown in FIG. 4, and '0' is digitally detected. Also, the amplitude detection circuit 33 is for detecting an amplitude value in an analog manner, however, may be implemented with the A/D converter as shown in FIG. 4.

The DC offset addition/subtraction circuit 41 has a function of adding/subtracting the DC offset included in the echo cancellation signal outputted from the subtractor 13A.

The control circuit 51 controls the echo cancellation output outputted from the subtractor 13A based on the detection results of the detection circuit units 31 to 33, and adjusts the echo cancellation output amplitude to the minimum. The control circuit 51 controls the DC offset addition/subtraction circuit 41 based on the detection results of the detection circuit units 31 to 33, and adds/subtracts the DC offset so that the output amplitude of the echo cancellation output is minimized for the echo cancellation output.

In such a configuration, when this-end transmission signal of '0' is detected by the 0 detection circuit 31, and the echo cancellation output of '0' is detected by the 0 detection circuit 32, the echo cancellation output should give no output, but actually, due to the variation in characteristics of e.g., transistors, the DC offset is outputted as an echo cancellation output. However, in the echo cancellation circuit 10D in the above-described configuration, when this-end transmission signal of '0' and the echo cancellation output of '0' are detected based on the detection results of the detection circuit units 31 to 33, the control circuit 51 controls the echo cancellation output to minimize the DC offset by adding/subtracting the DC offset so that the amplitude of the echo cancellation output is minimized.

Figure 9:
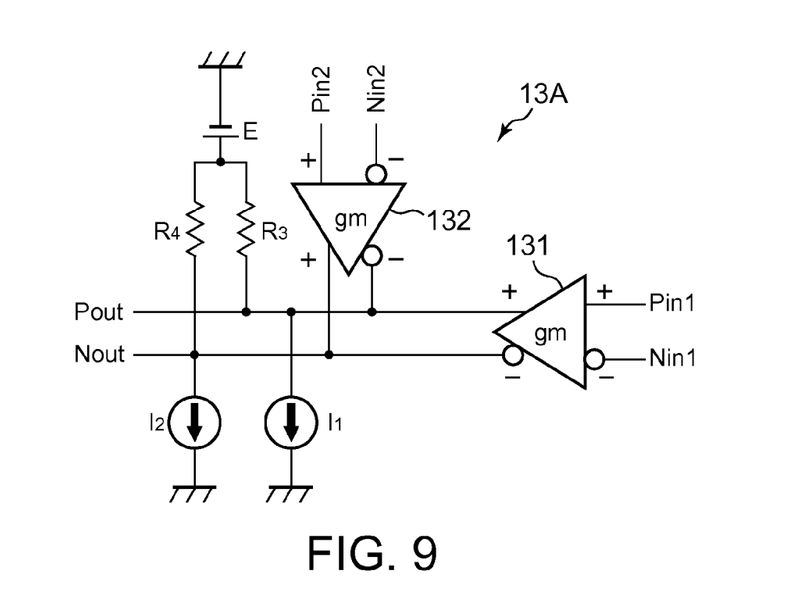
FIG. 9 is a circuit diagram showing an exemplary configuration of the subtractor in FIG. 8.

FIG. 9 shows an exemplary configuration of the subtractor 13A in FIG. 8.

The subtractor 13A shown in FIG. 9 includes the first amplifier 131 on the echo signal side with the transconductance of gm, the second amplifier 132 on the pseudo echo signal side with the transconductance of gm, the resistances R3, R4 for obtaining respective output voltages of P, N signals, the direct current power supply E, and current sources I1, I2 connected to respective lines of the output voltages Pout, Nout. The DC offset addition/subtraction circuit utilizing a part of the subtractor 13A is configured by connecting the current sources I1, I2 to the output line portions of the subtractor 13A. That is to say, the current sources I1, I2 correspond to the DC offset addition/subtraction circuit 41 in FIG. 8.

Differential input voltages Pin1, Nin1 of the echo signal are supplied to the first amplifier 131 as an input, and differential input voltages Pin2, Nin2 of the pseudo echo signal are supplied to the first amplifier 131 as an input. Input voltage Pin1 labeled with + is directly connected to the output voltage Pout line labeled with +; input voltage Nin1 labeled with − is directly connected to the output voltage Nout line labeled with −; input voltage Nin2 labeled with − is directly connected to the output voltage Pout line labeled with +; and input voltage Pin2 labeled with + is directly connected to the output voltage Pout line labeled with −. Furthermore, the current source I1 is connected between the line of the output voltage Pout, and the ground line; the current source I2 is connected between the line of the output voltage Nout, and the ground line.

In such a configuration, for the first amplifier 131 having a transconductance gm, the input voltages Pin1, Nin1 are converted to currents, and for the second amplifier 132 having a transconductance gm, the input voltages Pin2, Nin2 are converted to currents. In other words, when there is a voltage difference of 1V between the input voltages Pin1, Nin1 and the input voltages Pin2, Nin2, the operation of the subtractor 13 may be described in terms of the output of the current difference in ampere. In this manner, the current corresponding to the difference between the output current of the first amplifier 131, and the output current of the second amplifier 132 flows from the power supply E to the resistances R3, R4, and the voltages corresponding to the products between the current value and the resistances R3, R4 are outputted as output voltages Pout, Nout.

Now, the case where an offset voltage exists in the output line portion of the subtractor 13A is discussed. Conversely, in the case where no offset voltage exist, there is no difference between the output voltages Pout, Nout, i.e., Pout =Nout, the same current may be drawn from the current sources I1, I2 connected to the output line of the subtractor 13A. However, in the case where an offset voltage exists, the output voltages Pout, Nout have a difference corresponding to the magnitude of the offset voltage, thus by adjusting the quantity of the current to be drawn from either one of the current sources I1, I2, the difference between Pout and Nout can be changed so that Pout and Nout have the same potential. For example, when the output voltage Pout is higher than the other, by controlling at least the current of the current source I1 to draw additional current from the Pout rather than Nout, the output voltage Pout can be reduced so that Pout=Nout.

For the control of the offset, a voltage (≠0) is detected in an analog manner in the amplitude detection circuit 33 in the following states: this-end transmission signal generated in this-end communication device is digitally detected to be '0' in the detection circuit 31; the echo cancellation output outputted from the subtractor 13A is digitally detected to be '0' in the 0 detection circuit 32; and the reception signal inputted to two-way input/output terminal 12 from the other-end communication device is none, i.e., "0." Based on these pieces of information, the control circuit 51 determines that the offset voltage has occurred, and controls the DC offset addition/subtraction circuit 41 to add/subtract the DC offset so that the echo cancellation output amplitude is minimized, thus the minimum offset voltage is reached.

The 0 detection is achieved by the A/D converter shown in FIG. 4, and '0' is digitally detected. The '0' in this point indicates that the digital output of the A/D converter is 0. Also, because the amplitude value is detected in an analog manner, the value near 0 in an analog sense can be also detected. In the case where amplitude detection is achieved by the A/D converter shown in FIG. 4, ideally, it is desirable to reduce the threshold value for the A/D conversion to order to increase accuracy.

According to the fourth embodiment, when the echo cancellation output error is reduced before the two-way communication devices make two-way communication with each other through the same signal cable, the DC offset can be erased first, and consequently, the echo cancellation error can be reduced more effectively.

<Fifth Embodiment>

Figure 10:
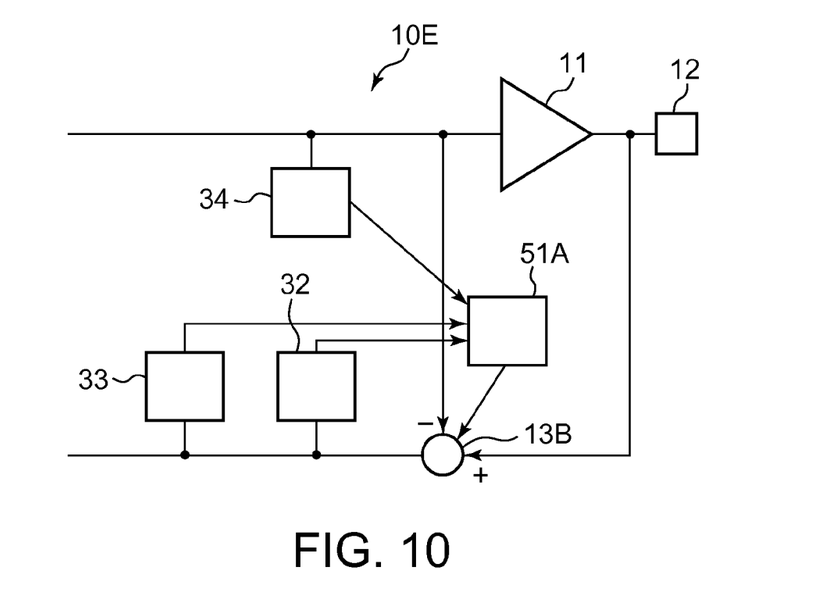
FIG. 10 is a block diagram showing an echo cancellation circuit according to a fifth embodiment of the present invention.

FIG. 10 is a block diagram showing an echo cancellation circuit according to the fifth embodiment of the present invention.

An echo cancellation circuit 10E in FIG. 10 is the echo cancellation circuit in full duplex two-way communication system in which a this-end communication device and the other-end communication device make two-way communication with each other through the same signal cable. The echo cancellation circuit 10E includes the output buffer 11, the two-way communication input/output terminal 12, the subtractor 13, non-zero detection circuit 34, the detection circuit units (34, 32, 33) including the '0' detection circuit 32, the amplitude detection circuit 33, and a control circuit 51A.

The two-way communication input/output terminal 12 is an input/output terminal for transmitting this-end transmission signal from this-end communication device to the other-end communication device or for receiving the other-end transmission signal from the other-end communication device.

The subtractor 13B has a positive input terminal and a negative input terminal, and variable gain input amplifiers connected to the respective input terminals on the positive side and the negative side; this-end transmission signal is inputted to the negative input terminal (−) as a pseudo echo signal; this-end transmission signal is inputted to the two-way communication input/output terminal 12 through the output buffer 11, while being inputted to the positive input terminal (+); the pseudo echo signal inputted to the negative input terminal is subtracted from the echo signal inputted to the positive input terminal; and the subtraction result is outputted to this-end communication device as an echo cancellation output. The amplifier in the subtractor 13B has a transconductance gm, and the gm is changeable, i.e., the gain of the amplifier can be changed by a control signal from the control circuit 51A.

The detection circuit units (34, 32, 33) include the non-zero detection circuit 34 for detecting non-zero value for this-end transmission signal; the 0 detection circuit 32 for detecting 0 value for the echo cancellation output from the subtractor 13B; and the amplitude detection circuit 33 for detecting the amplitude for the echo cancellation output from the subtractor 13B. The detection circuit units (34, 32, 33) detect non-zero value in this-end transmission signal, and detects 0 value and an amplitude in the echo cancellation output.

The 0 detection circuit 33 and non-zero detection circuit 34 are implemented with the A/D converter as shown in FIG. 4, and '0' is digitally detected. Also, the amplitude detection circuit 33 is for detecting an amplitude value in an analog manner, however, may be implemented with the A/D converter as shown in FIG. 4.

The control circuit 51A controls at least one of the signals between the echo signal inputted to the subtractor 13A and pseudo echo signal by controlling at least one gain of the input amplifiers based on the detection results of the detection circuit units 34, 32, 33 so that the echo cancellation output amplitude is adjusted to be the minimum. The control circuit 51A controls the amplifier of the subtractor 13B based on the detection results of the detection circuit units 31 to 33, and optimizes the input gain of the amplifier so that the output amplitude is minimized for the echo cancellation output.

The subtractor 13B may have the same configuration as that of the subtractor 13 shown in FIG. 3. In this case, for the adjustment of the gain, a voltage (≠0) is detected in an analog manner by the amplitude detection circuit 33 in the following states: this-end transmission signal generated in this-end communication device is digitally detected to be non '0' in the non-zero detection circuit 34, i.e., this-end transmission signal is present; the echo cancellation output outputted from the subtractor 13B is digitally detected to be '0' in the 0 detection circuit 32; and the reception signal inputted to two-way input/output terminal 12 from the other-end communication device is none, i.e., "0." Based on these piece's of information, the control circuit 51A determines that an echo cancellation output error exists, and automatically adjusts the gain of the amplifier in the subtractor 13B so that the echo cancellation output amplitude is minimized, thus the echo cancellation output amplitude is made the minimum.

According to the fifth embodiment, when the echo cancellation output error is reduced before the two-way communication devices make two-way communication with each other through the same signal cable, the echo cancellation output error can be minimized by the gain adjustment of the subtractor, and consequently, the echo cancellation error can be reduced more effectively.

<Sixth Embodiment>

Figure 11:
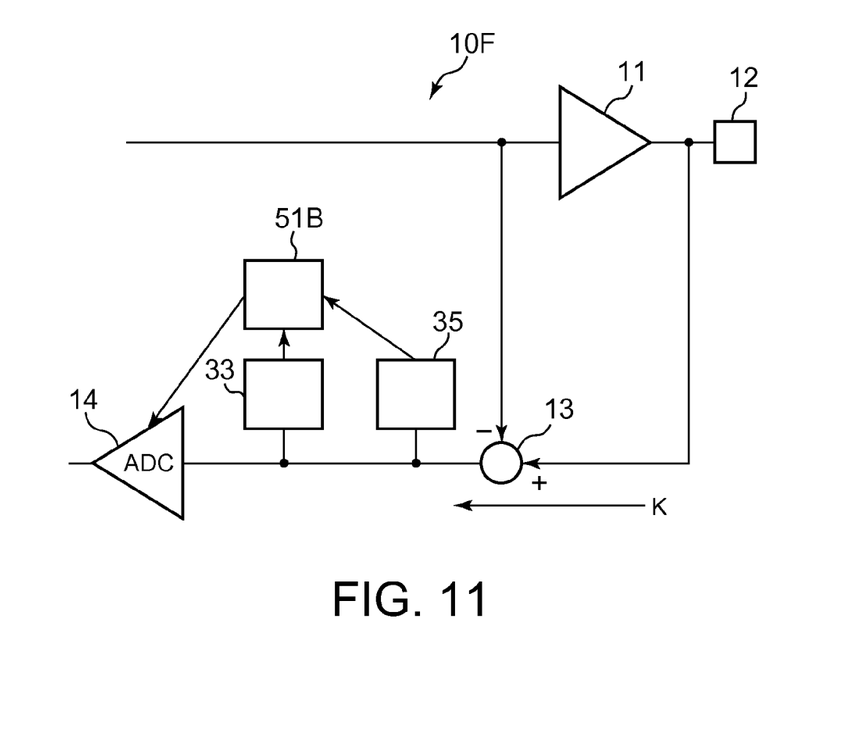
FIG. 11 is a block diagram showing an echo cancellation circuit according to a sixth embodiment of the present invention.
Figure 12:
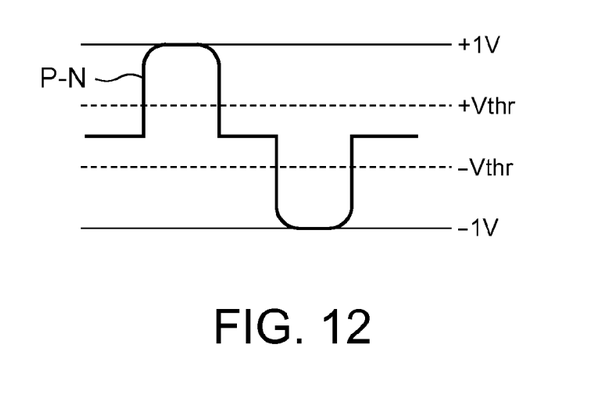
FIG. 12 is a diagram illustrating threshold value adjustment of a differential ternary.

FIG. 11 is a block diagram showing an echo cancellation circuit according to the sixth embodiment of the present invention. FIG. 12 is a diagram illustrating threshold value adjustment of a differential ternary.

An echo cancellation circuit 10F in FIG. 11 is the echo cancellation circuit in full duplex two-way communication system in which a this-end communication device and the other-end communication device make two-way communication with each other through the same signal cable. The echo cancellation circuit 10F includes the output buffer 11, the two-way communication input/output terminal 12, the subtractor 13, detection circuit units 33, 35 including the amplitude detection circuit 33 and non-zero detection circuit 35, a control circuit 51B, and the A/D converter 14 as an echo cancellation error reduction function. Because the output of the A/D converter 14 is a digital signal, in order to output the signal as an analog signal, a D/A converter is preferably arranged in a subsequent stage of the A/D converter 14.

The two-way communication input/output terminal 12 is an input/output terminal for transmitting this-end transmission signal from this-end communication device to the other-end communication device or for receiving the other-end transmission signal from the other-end communication device.

The subtractor 13 has a positive input terminal and a negative input terminal; pseudo echo signal generated by sending this-end transmission signal through the A/D converter 16 and the D/A converter 17 is inputted to negative input terminal; the signal generated by sending this-end transmission signal through the A/D converter 16 and the D/A converter 18 is inputted to the two-way communication input/output terminal 12, while being inputted to the positive input terminal as an echo signal; pseudo echo signal inputted to the negative input terminal is subtracted from the echo signal inputted to the positive input terminal; and the subtraction result is transmitted to this-end communication device as an echo cancellation signal.

The detection circuit units 33, 35 include non-zero detection circuit 35 for detecting non-zero value for the echo cancellation output from the subtractor 13, and the amplitude detection circuit 33 for detecting the amplitude for the echo cancellation output from the subtractor 13. The detection circuit units 33, 35 detect non-zero value in the echo cancellation output, and detect digital non-zero value and an amplitude in an analog manner in the echo cancellation output.

The control circuit 51B optimizes the threshold value of the A/D converter 14 according to the echo cancellation output amplitude when the echo cancellation output is non-zero value based on non-zero value of the echo cancellation output detected in the non-zero detection circuit 35, and the information of the echo cancellation output amplitude detected in the amplitude detection circuit 33.

The reason why such threshold value of the A/D converter 14 needs to be optimally set according to the echo cancellation output amplitude is as follows:

For example, as shown in the fifth embodiment in FIG. 10, when the echo cancellation output amplitude changes, e.g., in the reception signal path K shown in FIG. 11, the threshold value of the A/D converter 14 may be changed accordingly by switching the gain with the gain adjustment function provided in the amplifier of the subtractor 13 so that change in the echo cancellation output amplitude is suppressed, thereby providing an effective adjustment method.

FIG. 12 is a diagram illustrating threshold value adjustment of the A/D converter in the case of differential ternary.

In FIG. 12, the solid line shows an analog signal waveform of differential signal P-N in the case of differential ternary. In the case where a differential ternary analog signal is used as this-end transmission signal, the echo cancellation output from the subtractor 13 is outputted as a differential ternary signal similarly. Supposing that the range of differential signal P-N is from +1V to −1V, in order to obtain the range of '0' within the ternary (+1, 0, −1), trisecting the range from +1 to −1 is considered to be the best. That is to say, as shown in FIG. 12, two threshold values +Vthr (s) and −Vthr are taken between +1V and −1V (for example, ±0.333V). This is because regardless of the range on which noise lies, the best solution can be provided. For example, if two threshold values are set near +1 and −1, respectively, when the signal waveform becomes blunt and is rounded, +1 or −1 may not be detected. For example, in the case where the signal waveform becomes blunt, and threshold values are set too high, '0' is recognized as the current state when noise lies on the range in the state of "+1." From this view point also, appropriate threshold value exists for the maximum value of the signal, and the threshold value is preferably determined at the end of calibration of the echo cancellation output.

According to the fifth embodiment, when the echo cancellation output error is reduced before the two-way communication devices make two-way communication with each other through the same signal cable, the threshold values of the A/D converter can be optimized according to the echo cancellation output amplitude in order to eliminate the adverse effect of change in the echo cancellation output amplitude due to gain switching, and the adverse effect to signal determination due to signal deterioration, and consequently, the echo cancellation error can be reduced more effectively.

In each of the fourth to sixth embodiments described above, by adding the following circuits to the conventional echo cancellation circuit shown in FIG. 14, the echo cancellation output error can be effectively suppressed: a circuit needed to perform offset addition/subtraction; a circuit for performing gain adjustment of the amplifier; and a circuit for performing a threshold value adjustment of the A/D converter for echo cancellation removal.

It is also effective to combine the echo cancellation circuits 10A to 10C described in the first to third embodiments, and the echo cancellation circuits 10D to 10F described in the fourth to sixth embodiments. In this manner, by combining any one of the echo cancellation circuits 10A to 10C, and any one of the echo cancellation circuits 10D to 10F, the echo cancellation error can be suppressed even more.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An echo cancellation circuit in a full duplex two-way communication system in which a first communication device and a second communication device make two-way communication with each other through a same signal cable, the echo cancellation circuit comprising:
    an input/output terminal for transmitting a first transmission signal from the first communication device to the second communication device or receiving a second transmission signal transmitted from the second communication device;
    a subtractor having a positive input terminal and a negative input terminal, in which the first transmission signal is inputted to the negative input terminal as a pseudo echo signal, the first transmission signal is inputted through an output buffer to the positive input terminal as an echo signal, the pseudo echo signal inputted to the negative input terminal is subtracted from the echo signal inputted to the positive input terminal; and a result of the subtraction is outputted to the first communication device as an echo cancellation output;
    a detection circuit unit for performing any one of 0 value detection, non-zero value detection, and 0 value non-detection for the first transmission signal, and for performing either one of the 0 value detection and the non-zero value detection as well as amplitude detection for the echo cancellation output; and
    a control circuit for controlling at least one of echo signal and pseudo echo signal that are inputted to the subtractor or the echo cancellation output outputted from the subtractor, based on a detection result of the detection circuit unit, so that the echo cancellation output amplitude or a value regulating the output amplitude is adjusted to be optimized.

2. The echo cancellation circuit according to claim 1, further comprising a DC offset addition/subtraction circuit for adding/subtracting DC offset appearing in the echo cancellation output,
    wherein,
    the detection circuit unit performs the 0 value detection for the first transmission signal, and performs the 0 value detection and the amplitude detection for the echo cancellation output; and
    when the control circuit determines that DC offset exists based on a detection result of the detection circuit unit, the control circuit controls the DC offset addition/subtraction circuit to add/subtract the DC offset so that output amplitude of the echo cancellation output is minimized for the echo cancellation output.

3. The echo cancellation circuit according to claim 2, further comprising a variable gain amplifier for amplifying each of the echo signal and the pseudo echo signal that are inputted to the subtractor, wherein, the detection circuit unit performs the non-zero value detection for the first transmission signal, and performs the 0 value detection and the amplitude detection for the echo cancellation output; and the control circuit adjusts an input gain of the amplifier for at least one of the echo signal and the pseudo echo signal that are inputted to the subtractor, based on a detection result of the detection circuit unit, so that an echo cancellation output amplitude is minimized.

4. The echo cancellation circuit according to claim 3, further comprising an A/D converter for removing amplitude error provided in a subsequent stage of the detection circuit unit disposed on a path of the echo cancellation output, wherein, the detection circuit unit does not perform any value detection for the first transmission signal, and performs the non-zero value detection and the amplitude detection for the echo cancellation output; and when the control unit determines that the echo cancellation output is other than 0 value based on a detection result of the detection circuit unit, the control circuit optimizes the threshold value of the A/D converter according to an echo cancellation output amplitude.

5. The echo cancellation circuit according to claim 1, further comprising a variable gain amplifier for amplifying each of the echo signal and the pseudo echo signal that are inputted to the subtractor, wherein, the detection circuit unit performs the non-zero value detection for the first transmission signal, and performs the 0 value detection and the amplitude detection for the echo cancellation output; and the control circuit adjusts an input gain of the amplifier for at least one of the echo signal and the pseudo echo signal that are inputted to the subtractor, based on a detection result of the detection circuit unit, so that an echo cancellation output amplitude is minimized.

6. The echo cancellation circuit according to claim 5, further comprising an A/D converter for removing amplitude error provided in a subsequent stage of the detection circuit unit disposed on a path of the echo cancellation output, wherein, the detection circuit unit does not perform any value detection for the first transmission signal, and performs the non-zero value detection and the amplitude detection for the echo cancellation output; and when the control unit determines that the echo cancellation output is other than 0 value based on a detection result of the detection circuit unit, the control circuit optimizes the threshold value of the A/D converter according to an echo cancellation output amplitude.

7. The echo cancellation circuit according to claim 1, further comprising an A/D converter for removing amplitude error provided in a subsequent stage of the detection circuit unit disposed on a path of the echo cancellation output, wherein, the detection circuit unit does not perform any value detection for the first transmission signal, and performs the non-zero value detection and the amplitude detection for the echo cancellation output; and when the control unit determines that the echo cancellation output is other than 0 value based on a detection result of the detection circuit unit, the control circuit optimizes the threshold value of the A/D converter according to an echo cancellation output amplitude.

8. The echo cancellation circuit according to claim 1, further comprising:

a DC offset addition/subtraction circuit for adding/subtracting DC offset appearing on the echo cancellation output;

a variable gain amplifier for amplifying each of the echo signal and the pseudo echo signal that are inputted to the subtractor; and an A/D converter for removing amplitude error provided in a subsequent stage of the detection circuit unit disposed on a path of the echo cancellation output, wherein, based on a detection result of the detection circuit unit, the control circuit:

controls the DC offset addition/subtraction circuit to add/subtract the DC offset so that an output amplitude of the echo cancellation output is minimized for the echo cancellation output;

adjusts an input gain of the amplifier for at least one of echo signal and pseudo echo signal that are inputted to the subtractor, so that an echo cancellation output amplitude is minimized; and optimizes a threshold value of the A/D converter according to the echo cancellation output amplitude which is outputted from the subtractor.

* * * * *